United States Patent
Cho (10) Patent No.: US 11,718,423 B2
(45) Date of Patent: Aug. 8, 2023

(54) CONDENSING HEAT EXCHANGER WITH FLOW RESTRICTING INSERTS BETWEEN THE CONDENSER ELEMENT AND THE OUTLET HEADER

(71) Applicant: Hamilton Sundstrand Corporation, Charlotte, NC (US)

(72) Inventor: Wei-Lin Cho, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 33 days.

(21) Appl. No.: 17/554,554

(22) Filed: Dec. 17, 2021

(65) Prior Publication Data

US 2023/0192323 A1 Jun. 22, 2023

(51) Int. Cl.

| F28D 1/02 | (2006.01) |
| F28D 15/02 | (2006.01) |
| F28F 1/02 | (2006.01) |
| F28F 1/40 | (2006.01) |
| F28F 9/02 | (2006.01) |
| F28F 1/06 | (2006.01) |
| F28D 21/00 | (2006.01) |
| B64G 1/50 | (2006.01) |

(52) U.S. Cl.
CPC ............ *B64G 1/506* (2013.01); *F28D 1/0246* (2013.01); *F28D 15/0233* (2013.01); *F28F 1/022* (2013.01); *F28F 1/06* (2013.01); *F28F 1/40* (2013.01); *F28F 9/0282* (2013.01); *F28D 2021/0064* (2013.01); *F28D 2021/0071* (2013.01)

(58) Field of Classification Search
CPC combination set(s) only.
See application file for complete search history.

(56) References Cited

U.S. PATENT DOCUMENTS

| 8,234,881 | B2 * | 8/2012 | Yanik | F28D 1/05341 |
| | | | | 62/515 |
| 9,200,852 | B2 * | 12/2015 | Kroliczek | F28D 15/046 |
| 11,320,216 | B2 * | 5/2022 | Cho | F25B 39/028 |
| 11,439,923 | B2 * | 9/2022 | Cho | F25B 41/385 |
| 11,512,908 | B2 * | 11/2022 | Cho | F28F 1/40 |
| 2005/0042042 | A1 * | 2/2005 | Clarke | B01D 1/065 |
| | | | | 406/108 |
| 2005/0051318 | A1 * | 3/2005 | Fujita | F28F 9/0282 |
| | | | | 165/173 |

(Continued)

*Primary Examiner* — Jon T. Schermerhorn, Jr.
(74) *Attorney, Agent, or Firm* — Cantor Colburn LLP (57) ABSTRACT

An insert for a condensing heat exchanger, having: a body extending aft from a forward end to an aft end, and defining: a body exterior surface; a forward segment that extends aft from the forward end of the insert to a first axial location between the forward and aft ends of the insert, along the forward segment the body exterior surface is without openings; a middle segment that extends aft from the first axial location to a second axial location, along the middle segment the body exterior surface is cylindrical; and an aft segment that extends aft from the second axial location to the aft end of the insert, along the aft segment the body exterior surface of the body is cylindrical and defines axially extending grooves, and the grooves are spaced apart from each other and extend forward from the aft end of the insert to the middle segment.

20 Claims, 6 Drawing Sheets

(56) References Cited

U.S. PATENT DOCUMENTS

| | | | |
|---|---|---|---|
| 2009/0294112 A1* | 12/2009 | Reifel | F28F 1/40 |
| | | | 165/182 |
| 2020/0156023 A1* | 5/2020 | Manda Venkata Naga | |
| | | | B01F 25/3131 |
| 2021/0138358 A1 | 5/2021 | Cho | |
| 2021/0231390 A1 | 7/2021 | Cho | |
| 2021/0239407 A1 | 8/2021 | Cho | |
| 2021/0239408 A1* | 8/2021 | Cho | F28F 9/0282 |
| 2022/0244000 A1* | 8/2022 | Cho | F25B 39/028 |

* cited by examiner

CONDENSING HEAT EXCHANGER WITH FLOW RESTRICTING INSERTS BETWEEN THE CONDENSER ELEMENT AND THE OUTLET HEADER

BACKGROUND

The disclosed embodiments relate to condenser heat exchangers and more specifically to a condensing heat exchanger with flow restricting inserts between the condenser element and the outlet header.

In a condensing heat exchanger (a condenser) having parallel flow passages, vapor or two-phase fluid (the flow) enters the condenser through the inlet header. Energy is transferred from the flow to the cold condenser walls. After heat is removed from the flow, it condenses to a liquid. Condenser efficiency is determined in part by the duration for which the flow is inside (resides in) the condenser, the size of the contact area between the flow and the condenser, and the flow distribution in the condenser. Operating in a microgravity field may impact condenser efficiency. Flow direction inside the passage is affected by gravity. In a gravity field, a fluid moves in the direction of gravity. In a microgravity environment, if there is no disturbance, the fluid tends to move in a straight direction after flowing through the inlet header. In this case, the vapor or two-phase flow will have less opportunity to have good contact with the condenser wall, which may result in a low condenser operating efficiency.

SUMMARY OF THE DISCLOSURE

Disclosed is an insert for a parallel passage condensing heat exchanger, the insert including: a forward end, an aft end, and a body extending aft from the forward end to the aft end, the body defining: a body exterior surface; a forward segment that extends aft from the forward end of the insert to a first axial location between the forward and aft ends of the insert, wherein along the forward segment the body exterior surface is without openings and has a frustoconical shape; a middle segment that extends aft from the first axial location to a second axial location that is forward of the aft end of the insert, wherein along the middle segment the body exterior surface is cylindrical; and an aft segment that extends aft from the second axial location to the aft end of the insert, wherein along the aft segment the body exterior surface of the body is cylindrical and defines axially extending grooves, and wherein the grooves are circumferentially spaced apart from each other and extend forward from the aft end of the insert to the middle segment to define a forward end of the grooves.

In addition to one or more disclosed aspects of the insert or as an alternate, the insert is formed of a porous material.

In addition to one or more disclosed aspects of the insert or as an alternate, the porous material has a 30%-40% porosity.

In addition to one or more disclosed aspects of the insert or as an alternate, the grooves have an arcuate cross-section.

In addition to one or more disclosed aspects of the insert or as an alternate, the forward end of the insert defines a blunt-nose shape.

In addition to one or more disclosed aspects of the insert or as an alternate, the insert further includes: an outer ring surround at least a portion of the middle segment, wherein the outer ring includes a forward end, an aft end, and a ring body that extends axially between the forward and aft ends of the outer ring, and wherein the ring body has an inner diameter that is larger than an outer diameter of the body of the insert to define a plenum therebetween; and a flange defined at the aft end of the outer ring, wherein the flange connects with the body exterior surface of the insert at a location that is axially adjacent to, and aft of, the forward end of the grooves to thereby define flow inlet apertures at the forward end of the grooves, wherein the flow inlet apertures are configured to receive flow that is directed aft within the plenum.

In addition to one or more disclosed aspects of the insert or as an alternate, the insert has a center channel that extends axially from the aft end of the insert to the forward segment of the insert, and wherein the center channel defines an aft aperture at the aft end of the insert.

Further disclosed is a condensing heat exchanger, including: an outlet header having a forward end, an aft end, and a header body extending between the forward and aft ends, wherein the outlet header defines: an outlet channel that is configured to direct the flow away from the heat exchanger; and outlet passages, each the of the outlet passages having a forward end, an aft end that is fluidly coupled to the outlet channel, and a passage wall extending between the forward and aft ends, and wherein each of the header outlet passages has a diameter that is sized to receive an aft end of an insert having one or more of the aspects disclosed herein.

In addition to one or more disclosed aspects of the heat exchanger or as an alternate, the outlet header defines a header groove in the forward end of the outlet header that has an outer groove portion and inner groove portions that are surrounded by the outer groove portion, wherein: the outer groove portion defines an outer wall that extends aft from the forward end of the outlet header to an outer seat portion; the inner groove portions each define an outer wall that extends aft from the outer seat portion of the outer groove portion to an inner seat portion; the inner groove portions are cylindrical and positioned to surround respective ones of the outlet passages of the outlet header; the inner seat portion of the inner groove portions are configured to seat the aft end of the outer ring of the insert; and the inner groove portions have a depth that is complementary to a length of the outer ring of the insert and have a groove inner diameter that is larger than the diameter of the outer ring of the insert.

In addition to one or more disclosed aspects of the heat exchanger or as an alternate, the heat exchanger further includes a condenser element that includes a forward end, an aft end, and a condenser body extending aft from the forward end to the aft end, and wherein the condenser body defines parallel condenser passages extending from the forward end to the aft end, and each of the condenser passages is aligned to face one of the outlet passages in the outlet header and is configured to receive the forward segment of the insert.

In addition to one or more disclosed aspects of the heat exchanger or as an alternate, the outer groove portion of the header groove is sized to receive and surround the aft end of the condenser body.

In addition to one or more disclosed aspects of the heat exchanger or as an alternate: the condenser passages each include a sidewall that defines condenser passage grooves; each of the condenser passage grooves defines a base end, an apex end, and sidewall portions of the sidewall extending from the base end to the apex end, to define an inner diameter at the base end and a nominal diameter at the apex end.

In addition to one or more disclosed aspects of the heat exchanger or as an alternate: the body exterior surface of the insert engages the inner diameter of one of the condenser passages; and the inner diameter of the outer ring of the insert is larger than the nominal diameter of the one of the condenser passages, so that the forward end of the outer ring of the insert is disposed against the aft end of the condenser body.

In addition to one or more disclosed aspects of the heat exchanger or as an alternate, the heat exchanger further includes an inlet header defining an inlet channel and plurality of inlet header passages that are fluidly coupled to both the inlet channel and the condenser passages.

Further disclosed is a method of manufacturing a parallel passage condensing heat exchanger, the method including: forming a grooved parallel passage condenser element to include a forward end, an aft end, and a condenser body extending aft from the forward end to the aft end, wherein the condenser body defines parallel condenser passages extending from the forward end to the aft end; forming a plurality of porous inserts, wherein each insert of the plurality of inserts is formed to include: a forward end, an aft end, and a body extending aft from the forward end to the aft end, the body defining: a body exterior surface; a forward segment that extends aft from the forward end of the insert to a first axial location between the forward and aft ends of the insert, wherein along the forward segment the body exterior surface is without openings and has a frustoconical shape; a middle segment that extends aft from the first axial location to a second axial location that is forward of the aft end of the insert, wherein along the middle segment the body exterior surface is cylindrical; and an aft segment that extends aft from the second axial location to the aft end of the insert, wherein along the aft segment the body exterior surface of the body is cylindrical and defines axially extending grooves, and wherein the grooves are circumferentially spaced apart from each other and extend forward from the aft end of the insert to the middle segment to define a forward end of the grooves; and positioning the inserts in the condenser element, so that the forward segment of the inserts extend into respective ones of the condenser passages.

In addition to one or more disclosed aspects of the method or as an alternate, the inserts are formed of a porous material having a 30%-40% porosity.

In addition to one or more disclosed aspects of the method or as an alternate, the condenser passages are each formed to include a sidewall that defines condenser passage grooves, wherein each of the condenser passage grooves defines a base end, an apex end, and sidewall portions of the sidewall extending from the base end to the apex end, to define an inner diameter at the base end and a nominal diameter at the apex end.

In addition to one or more disclosed aspects of the method or as an alternate, the insert is formed such when the inserts are positioned in the condenser passages, the body exterior surface of the insert engages the inner diameter of the condenser passages, and the inner diameter of the outer ring of the insert is larger than the nominal diameter of the condenser passages, so that the forward end of the outer ring of the insert is disposed against the aft end of the condenser body. In addition to one or more disclosed aspects of the method or as an alternate, the method further includes: forming a grooved outlet header to have a forward end, an aft end, and a header body extending between the forward and aft ends, wherein the outlet header defines: an outlet channel that is configured to direct the flow away from the heat exchanger; and outlet passages that are located to face respective ones of the condenser passages, each the of the outlet passages having a forward end, an aft end that is fluidly coupled to the outlet channel, and a passage wall extending between the forward and aft ends; and connecting the outlet header to the condenser element so that the aft segment of the inserts extend into respective ones of the outlet passages in the outlet header.

In addition to one or more disclosed aspects of the method or as an alternate: the outlet header is formed to define a header groove in the forward end of the outlet header that has an outer groove portion and inner groove portions that are surrounded by the outer groove portion; the outer groove portion defines an outer wall that extends aft from the forward end of the outlet header to an outer seat portion, wherein the outer groove portion of the header groove is sized to receive and surround the aft end of the condenser body; and each of the inner groove portions: defines an outer wall that extends aft from the outer seat portion of the outer groove portion to an inner seat portion that is configured to seat the aft end of the outer ring of respective ones of the inserts; is cylindrical and positioned to surround respective ones of the outlet passages of the outlet header; and has a depth that is complementary to a length of the outer ring of the insert and has a groove inner diameter that is larger than the diameter of the outer ring of the insert.

BRIEF DESCRIPTION OF THE DRAWINGS

The following descriptions should not be considered limiting in any way. With reference to the accompanying drawings, like elements are numbered alike:

FIG. 7 (*a*) is a perspective view of an insert;

FIG. 7(*b*) is a cross-sectional view of the insert through its center;

DETAILED DESCRIPTION

A detailed description of one or more embodiments of the disclosed apparatus and method are presented herein by way of exemplification and not limitation with reference to the Figures.

According to disclosed embodiments discussed in greater detail below, porous, flow restricting inserts are placed between condenser passages and an outflow header of a condenser. The inserts create backpressure, which results in increasing duration of a flow within the condenser passages, and also increasing surface contact between the flow and the surfaces of the condenser passages, which thereby increase condenser efficiency.

Figure 1:
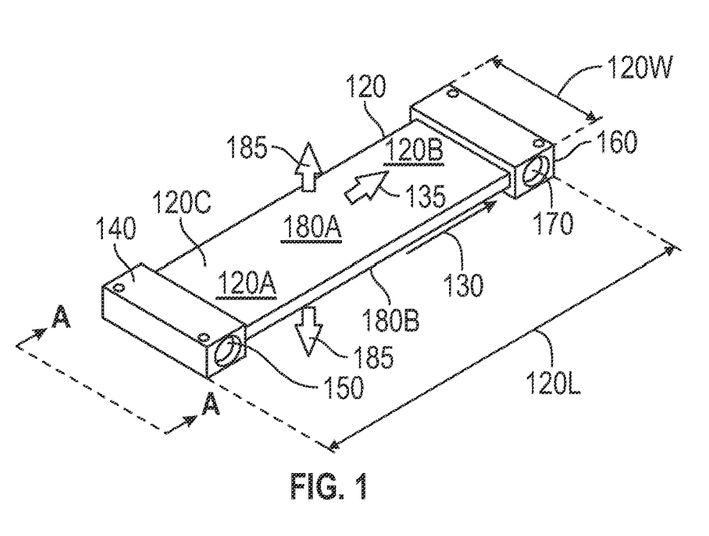
FIG. 1 shows a condenser (i.e., condensing heat exchanger) assembly according to an embodiment.

FIG. 1 shows a condenser (i.e., condensing heat exchanger) 110 which includes a condenser element 120 having a forward (or inlet) end 120A and an aft (or outlet) end 120B and a condenser body 120C extending from the forward end 120A to the aft end 120B along a condenser length 120L. According to the disclosed embodiments, the condenser length 120L is along a flow direction 130 of a flow 135 through the condenser body 120C. An inlet header 140 with an inlet passage (or channel) 150 is coupled to the forward end 120A and an outlet header 160 with an outlet passage 170 is coupled to the aft end 120B. The flow direction 130 is along a direction of the condenser length 120L. The condenser body 120C defines a top side 180A and a bottom side 180B. Waste heat 185 can be rejected from either side or both sides 180A, 180B, of the condenser body 120C. A footprint (condenser length 120L and width 120W) of the condenser body 120C can be tailored to accommodate different sizes of heat sinks for heat rejection.

Figure 2:
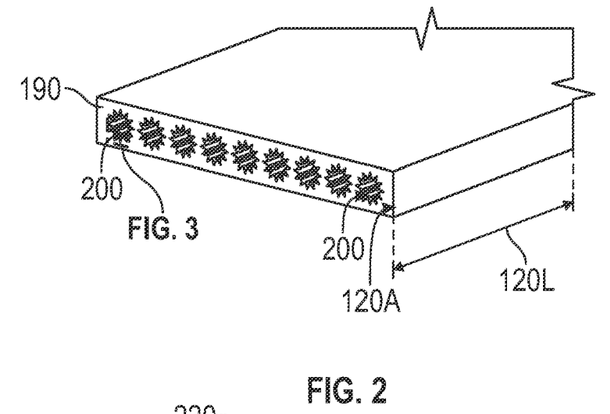
FIG. 2 shows a condenser element with parallel condenser passages.

As shown in FIG. 2, the condenser body 120C defines a solid surface 190 with parallel grooved flow condenser passages (or channels), generally referenced as 200 extending therethrough along the condenser length 120L, between the forward and aft ends 120A, 120B (FIG. 1).

Figure 3:
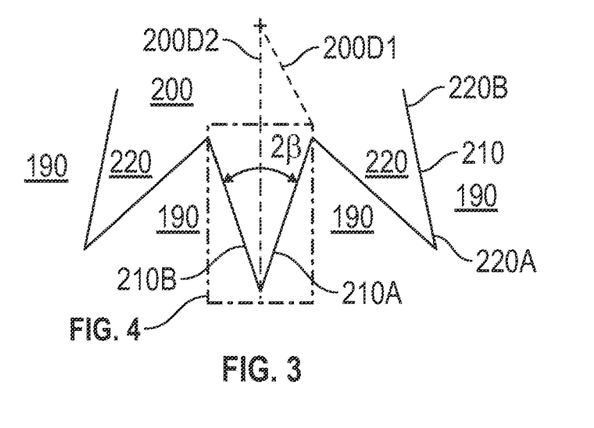
FIG. 3 is a detail, identified in FIG. 2, of a grooved passage.
Figure 4:
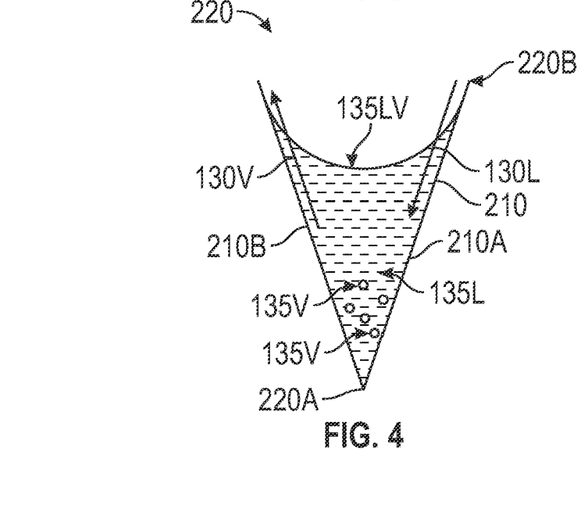
FIG. 4 is a detail, identified in FIG. 3, of a grooved passage showing a flow of liquid and vapor along sidewalls of the grooved passage.

As shown in FIG. 3 the condenser passages 200 each have a sidewall 210 that defines grooves, generally referenced as 220. For each of the grooves 220, the sidewall 210 has sidewall portions 210A, 210B that diverge from a groove apex (or apex end) 220A to a groove base (or base end) 220B to define a passage inner diameter 200D1 at the groove base 220B and a passage nominal (or outer) diameter 200D2 at the groove apex 220A (the diameter labels in FIG. 3 extend to the center of the condenser passage 200). The groove sidewall portions 210A, 210B define a groove opening angle, which is formed to be 2β such that β is smaller than or equal to 90° minus a contact angle between the groove sidewall portions 210A, 210B and the flow. For example, the maximum designed value of β will be 18 degrees if the contact angle between the sidewall portions 210A, 210B and the working fluid is 72 degrees. As shown in FIG. 4, grooves 220 with the opening angle 213 are capable of moving the flow in a liquid phase 135L in a liquid moving direction 130L from the groove base 220B toward the groove apex 220A and expelling vapor 135V from the groove apex 220A toward the groove base 220B in a vapor moving direction 130V, to thereby form a liquid/vapor interface 135LV in the flow 135.

The condenser passages 200 provide an increased contact area between the hot fluid flow and the condenser body 120C compared to that of the smooth bore tube. The effect of the addition of the grooves 220 is an extended surface in a finned tube. The grooves 220 also provide a large flow area compared with a smooth bore tube of the mini-channel or micro-channel condenser. The large flow area also results in a lower pressure drop compared to that of the smooth bore tube of the mini-channel or micro-channel condenser.

Figure 5:
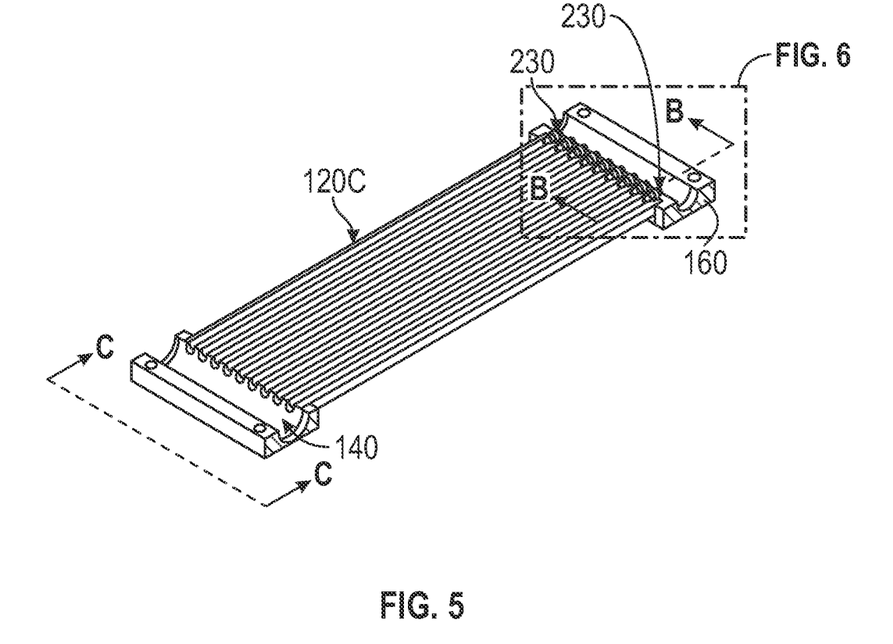
FIG. 5 is a cross-sectional view of the condenser taken along lines A-A in FIG. 1 so that an upper portion of the condenser is removed, and with porous inserts installed between an outlet header and the condenser passages.
Figure 6:
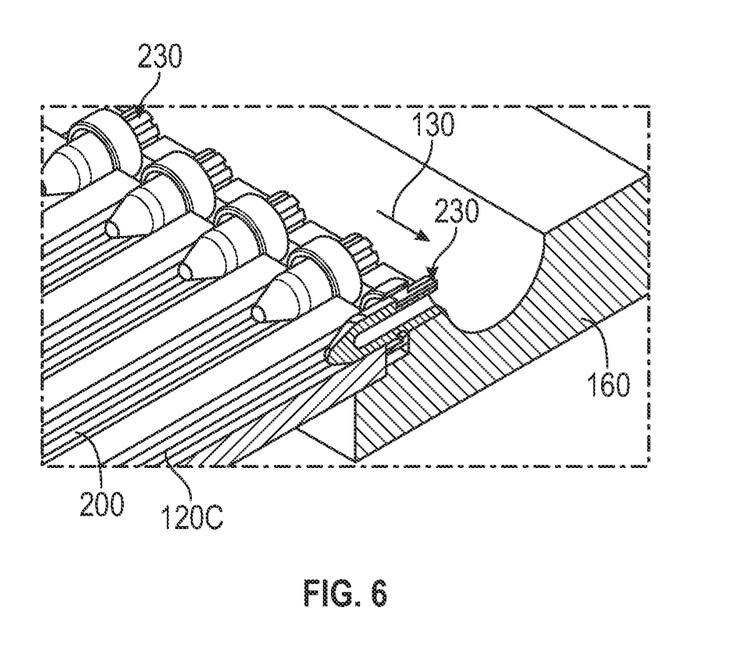
FIG. 6 is a detail, identified in FIG. 5, of the condenser with the inserts installed between the outlet header and the condenser passages, where the detail is shown as a cross-section taken along lines B-B shown in FIG. 5.

Turning to FIGS. 5-6, to prevent vapor or two-phase flow from directly blowing through the condenser passages 200, an insert 230 is installed in between the outlet header 160 and each of the condenser passages 200. The insert 230 is configured to restrict flow out of the condenser body 120C, and thus create backpressure in the outlet header 160. Due to backpressure created by the insert 230, there is an increased time in the condenser 110 for the vapor or two-phase flow, which increases the efficiency of the condenser 110.

Figure 7A:
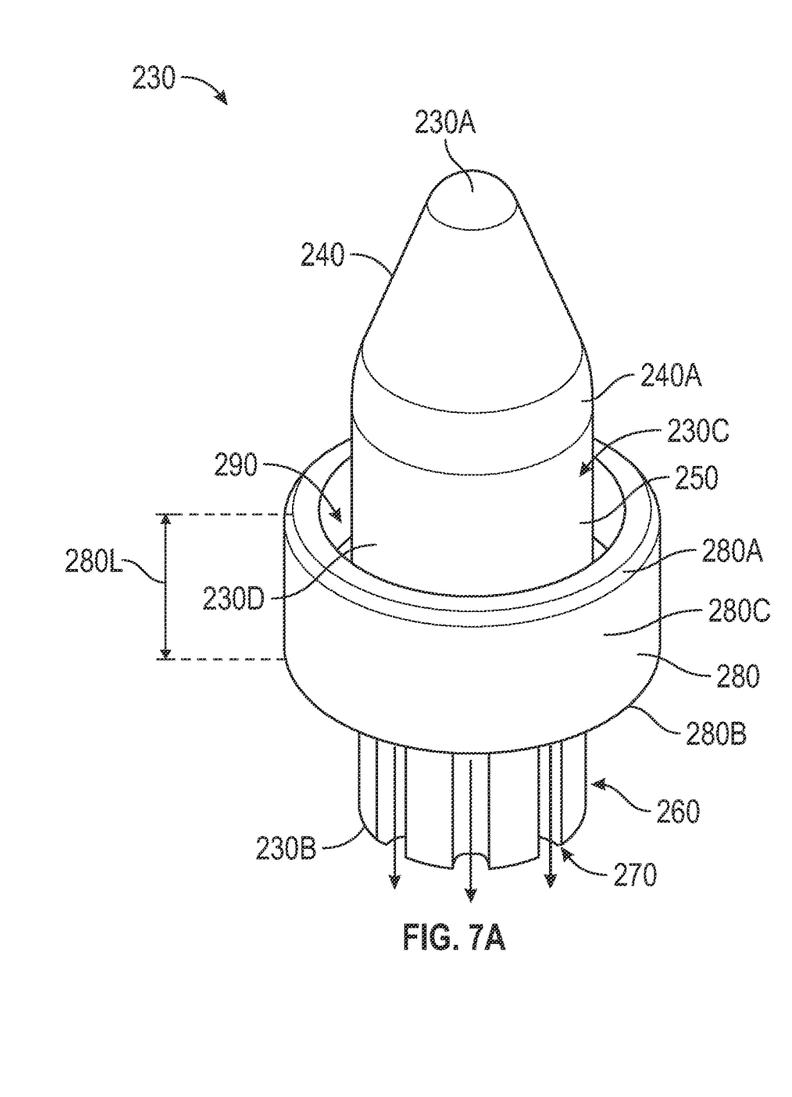
Figure 7B:
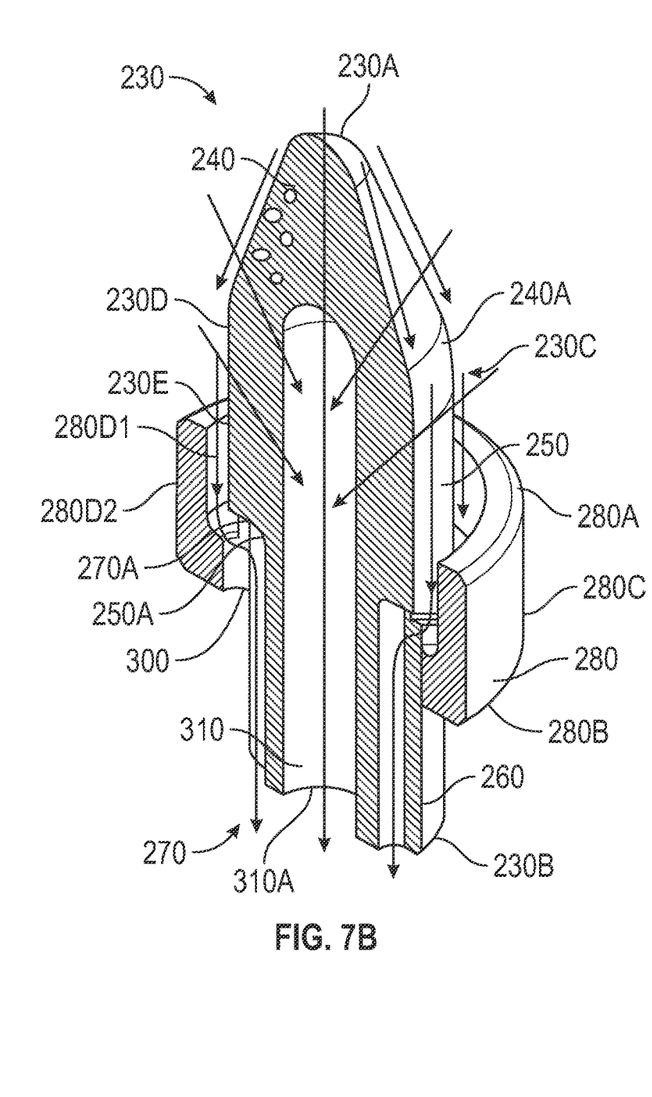

Turning to FIGS. 7(a) and 7(b) the inert has a forward end 230A, an aft end 230B, and an insert body 230C extending axially from the forward end 230A to the aft end 230B. The insert body 230C defines an exterior surface (or body exterior surface) 230D.

A forward segment 240 of the insert body 230C extends aft from the forward end 230A of the insert 230 to a first axial location 240A that is between the forward and aft ends 230A, 230B of the insert 230. Along the forward segment 240, the exterior surface 230D is without openings and has a frustoconical shape. The forward end 230A of the insert 230 defines a blunt-nose shape.

A middle segment 250 of the insert body 230C extends aft from the first axial location 240A to a second axial location 250A that is forward of the aft end 230B of the insert 230. There is a smooth transition between the forward segment 240 and middle segment 250 at the first axial location 240A. Along the middle segment 250, the exterior surface 230D is cylindrical.

An aft segment 260 of the insert body 230C extends aft from the second axial location 250A to the aft end 230B of the insert 230. Along the aft segment 260, the exterior surface 230D of the insert body 230C is cylindrical and defines axially extending grooves (or channels) generally referenced as 270. The insert grooves 270 are circumferentially spaced apart from each other and extend from the aft end of the insert 230B to a forward end 270A of the insert grooves 270 located at the middle segment 250, e.g., at the second axial location 250A. The insert grooves 270 have a cross-section that is arcuate and may be semicircular or U-shaped, as non-limiting examples. The figures illustrate eight equally sized and spaced apart insert grooves 270, though this is not limiting.

An outer ring 280 surrounds at least a portion of the middle segment 250 and includes a forward end 280A, an aft end 280B, and a ring body 280C that extends axially between the forward and aft ends 280A, 280B of the outer ring 280 to define a ring length 280L. The ring body 280C has an inner diameter 280D1 that is larger than an outer diameter 230E of the insert body 230C to create a plenum 290 therebetween. The ring body 280C has an outer diameter 280D2 that is based on a thickness of the ring material. The aft end 280B of the outer ring 280 defines an inner flange 300 that connects with the exterior surface 230D of the insert body 230C at a location that is axially adjacent to, and aft of, the forward end 270A of the insert grooves 270. The configuration defines flow inlet apertures, generally referenced as 305, at the forward end 270A of the insert grooves 270, which are configured to receive flow 135 that is directed aft within the plenum 290.

A center channel 310 extends axially from the aft end 230B of the insert 230 to the forward segment 240, e.g., at the first axial location 240A. At the aft end 230B of the insert 230, at the center channel 310 defines an aft aperture 310A. The insert 230 is formed of a porous material having, e.g., a 30%-40% porosity such that flow pressure may cause fluid to travel from the exterior surface 230D of the insert 230 to the center channel 310 and out the aft aperture 310A. Such pressure may occur if, for example, the insert inlet apertures 305 become clogged with debris. This configuration may also prevent the flow from choking within the condenser passages 200 (FIG. 6) due to the buildup of backpressure from the utilization of the insert 230. The insert 230 has a smaller total flow area than the condenser passages 200 in which it is seated. This creates a backpressure to achieve a uniform flow distribution through the condenser passages 200 of the condenser 110.

Figure 8:
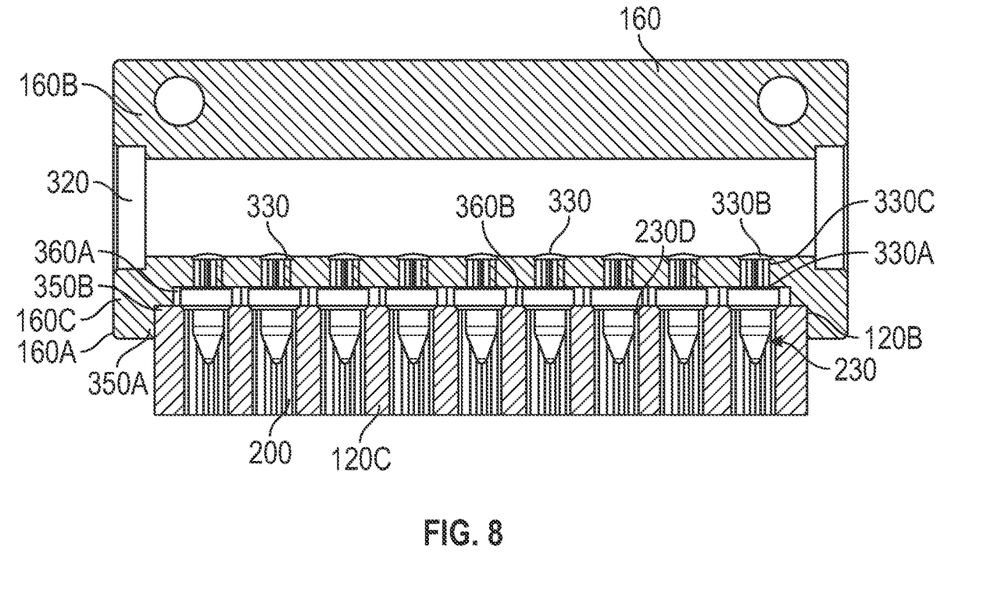
FIG. 8 is a cross-sectional top view of the condenser showing the outlet header and an aft end the condenser element, with inserts installed between the outlet header and the condenser passages.
Figure 9:
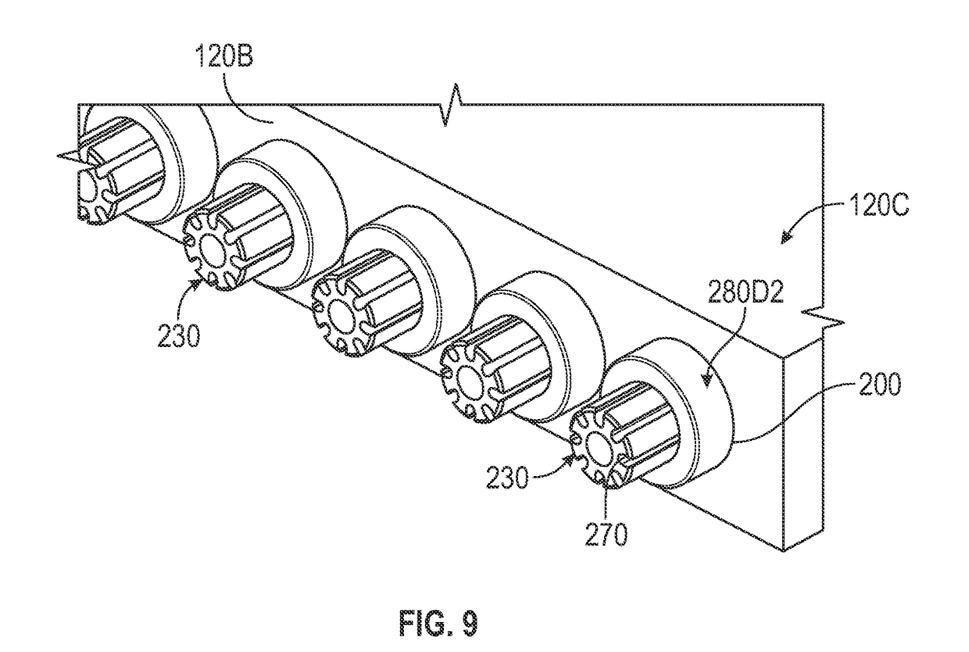
FIG. 9 is a perspective view of the condenser element with the outlet header removed and the inserts installed in the condenser passages.

Turning to FIGS. 8 and 9, the exterior surface 230D of the insert 230 is sized to tightly fit, e.g., with a friction fit or a close tolerance slip fit, within the condenser passages 200, e.g., against the groove base 220B of the condenser passages 200 (FIG. 4). With this configuration, flow through the condenser passages 200 within its inner diameter 200D1 (FIG. 4) is blocked at the insert 230. The outer ring 280 has an outer diameter 280D2 that is larger than or the same size as the diameter 200D2 formed by the groove apex 220A of the condenser passages 200 (FIG. 4). With this configuration, the plenum 290 is configured to receive flow against the insert 230 and direct the flow through the grooves 220 in the condenser passages 200 and into the insert inlet apertures 305 (FIG. 7B) of the insert 230. This way, fluid may flow out of the insert grooves 270 in the insert 230 and into the outlet header 160.

The outlet header 160 has a forward end 160A, an aft end 160B and a header body 160C extending between the forward and aft ends 160A, 160B. The outlet header 160 defines an outlet channel 320 that is configured to direct flow away from the condenser 110. The outlet header 160 further defines outlet passages 330, each having a forward end 330A, an aft end 330B that is fluidly coupled to the outlet channel 320, and a passage wall 330C extending between the forward and aft ends 330A, 330B. The outlet passages 330 are positioned to face the condenser passages 200 and have a diameter 330D that is sized to receive the aft end 270B of the insert 230, either with a friction fit or with a close tolerance slip fit.

Figure 10:
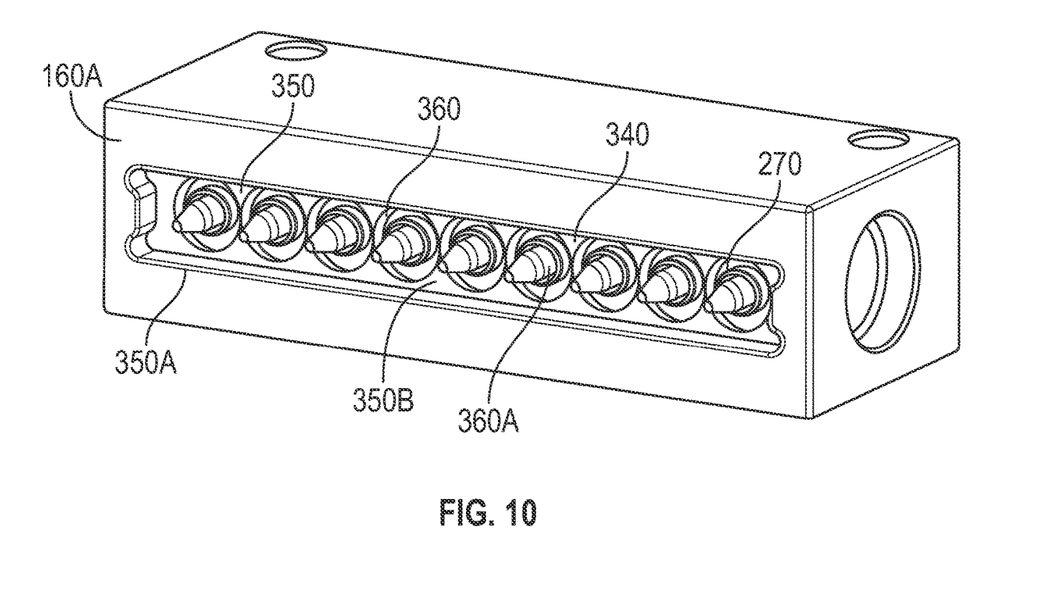
FIG. 10 is a front-perspective view of the outlet header with inserts installed in the outlet passages.
Figure 11:
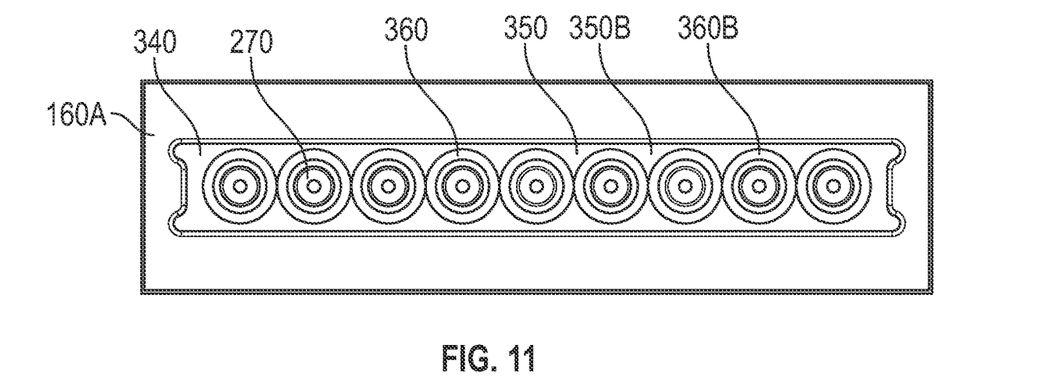
FIG. 11 is a front view of the outlet header with inserts installed in the outlet passages.

Turning to FIGS. 8, 10 and 11, a header groove 340 is defined in the forward end 160A of the outlet header 160 and has an outer groove portion 350 and inner groove portions, generally reference as 360, that are surrounded by the outer groove portion 350. With this configuration, the outlet header 160 may be referred to as a grooved-end outlet header 160.

The outer groove portion 350 defines an outer wall 350A that extends aft from the forward end 160A of the outlet header 160 to an outer seat portion 350B. The outer groove portion 350 is sized to receive the aft end 120B of the condenser body 120C with a friction fit or a close tolerance slip fit. The inner groove portions 360 each define an outer wall 360A that extends aft from the outer seat portion 350B of the outer groove portion 350 to an inner seat portion 360B. The inner groove portions 360 of the header groove 340 are cylindrical and surround respective ones of the outlet passages 330. The inner seat portion 360B of the inner groove portions 360 are configured to seat the aft end 280B of the outer ring 280 of each insert 230. The inner groove portions 360 have a depth that is complementary to the ring length 280L of the outer ring 280 of the insert 230 and have an outer diameter that is larger than the outer diameter 280D2 of the outer ring 280 of the insert 230. The outer seat portion 350B of the outer groove portion 350, between and around the inner groove portions 360, is utilized to seat the aft end 120B of the condenser body 120C.

Figure 12:
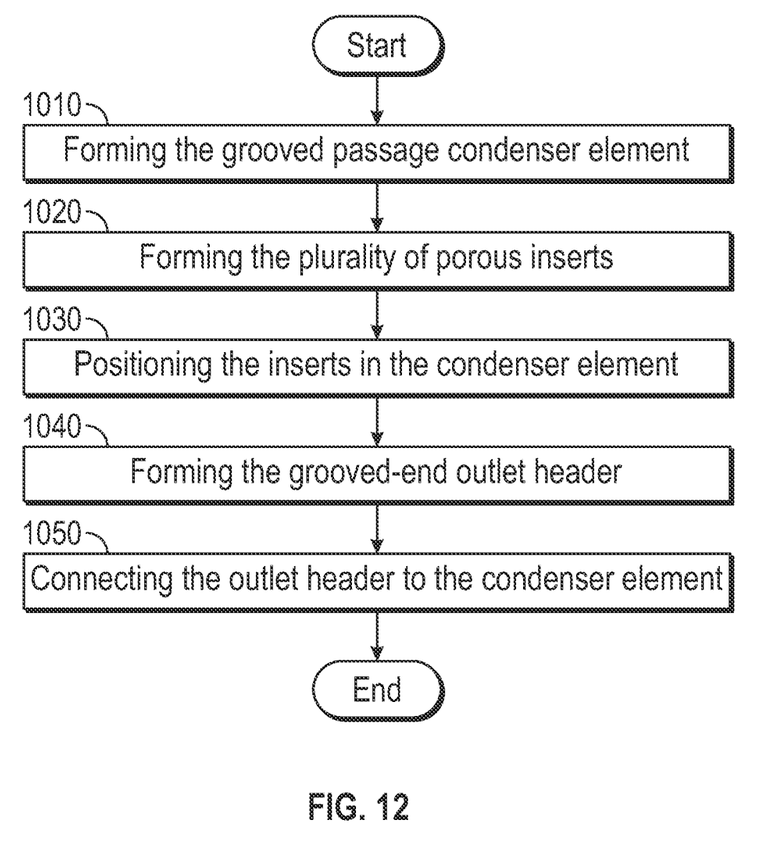
FIG. 12 is a flowchart showing a method of guiding a flow through a condenser.

Turning to FIG. 12, a flowchart shows a method of manufacturing a parallel passage condensing heat exchanger. As shown in block 1010 the method includes forming the grooved passage condenser element 120. As shown in block 1020 the method includes forming the plurality of porous inserts 230. As shown in block 1030 the method includes positioning the inserts 230 in the condenser element 120, e.g., so that the forward segment 240 of the inserts 230 extend into respective ones of the condenser passages 200. As shown in block 1040 the method includes forming the grooved-end outlet header 160. As shown in block 1050 the method includes connecting the outlet header 160 to the condenser element 120, so that the aft segment 260 of the inserts 230 extend into respective ones of the outlet passages 330 in the outlet header 160.

As indicated, in case of a flow passage blockage, the liquid can still flow out of the condenser passages through the pores of the porous inserts. However, vapor will be blocked by the physical barrier formed by the liquid and the insert pores. Only the fluid can flow out of the condenser passages, through the space formed by the porous inserts, and the grooves.

The above embodiments provide a condenser having an inlet header, an outlet header, a condenser body with condenser passages, and multiple porous inserts. The condenser footprint can be tailored to different sizes to accommodate different sizes of heat sink for heat rejection.

The condenser passages are able to control liquid location, provide extended surface for better heat transfer, and offer large flow area for low pressure drop, which improves condenser performance. The porous inserts can restrict flow area to achieve uniform flow distribution in the condenser. That is, conical front end of the porous inserts block the main flow passage and redirect the main flow area through the condenser passages to prevent a direct blow through and create desired backpressure. This creates uniform flow distribution in the condenser and increase vapor flow resident time within the condenser. In the case of porous insert flow passage blockage, the liquid can still flow out of the condenser passages through the pores of the inserts.

As indicated, time of the vapor or the two-phase flow inside the condenser, the size of the contact area between the vapor or the two-phase flow and the condenser, and the vapor or two-phase flow distribution in the condenser are factors in determining the condenser efficiency. The disclosed embodiments address these factors to improve the condenser (condensing heat exchanger) operating efficiency in terrestrial and microgravity environment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An insert for a parallel passage condensing heat exchanger, the insert comprising:
a forward end, an aft end, and a body extending aft from the forward end to the aft end, the body defining:
a body exterior surface;
a forward segment that extends aft from the forward end of the insert to a first axial location between the forward and aft ends of the insert, wherein along the forward segment the body exterior surface is without openings and has a frustoconical shape;
a middle segment that extends aft from the first axial location to a second axial location that is forward of the aft end of the insert, wherein along the middle segment the body exterior surface is cylindrical; and
an aft segment that extends aft from the second axial location to the aft end of the insert, wherein along the aft segment the body exterior surface of the body is cylindrical and defines axially extending grooves, and wherein the grooves are circumferentially spaced apart from each other and extend forward from the aft end of the insert to the middle segment to define a forward end of the grooves.

2. The insert of claim 1, wherein
the insert is formed of a porous material.

3. The insert of claim 2, wherein
the porous material has a 30%-40% porosity.

4. The insert of claim 2, wherein
the grooves have an arcuate cross-section.

5. The insert of claim 2, wherein
the forward end of the insert defines a blunt-nose shape.

6. The insert of claim 2, further comprising:
an outer ring surround at least a portion of the middle segment, wherein the outer ring includes a forward end, an aft end, and a ring body that extends axially between the forward and aft ends of the outer ring, and wherein the ring body has an inner diameter that is larger than an outer diameter of the body of the insert to define a plenum therebetween; and
a flange defined at the aft end of the outer ring, wherein the flange connects with the body exterior surface of the insert at a location that is axially adjacent to, and aft of, the forward end of the grooves to thereby define flow inlet apertures at the forward end of the grooves, wherein the flow inlet apertures are configured to receive flow that is directed aft within the plenum.

7. The insert of claim 6, wherein
the insert has a center channel that extends axially from the aft end of the insert to the forward segment of the insert, and wherein the center channel defines an aft aperture at the aft end of the insert.

8. A condensing heat exchanger, comprising:
an outlet header having a forward end, an aft end, and a header body extending between the forward and aft ends,
wherein the outlet header defines:
an outlet channel that is configured to direct the flow away from the heat exchanger; and
outlet passages, each the of the outlet passages having a forward end, an aft end that is fluidly coupled to the outlet channel, and a passage wall extending between the forward and aft ends, and
wherein each of the header outlet passages has a diameter that is sized to receive an aft end of an insert of claim 7.

9. The heat exchanger of claim 8, wherein
the outlet header defines a header groove in the forward end of the outlet header that has an outer groove portion and inner groove portions that are surrounded by the outer groove portion, wherein:
the outer groove portion defines an outer wall that extends aft from the forward end of the outlet header to an outer seat portion;
the inner groove portions each define an outer wall that extends aft from the outer seat portion of the outer groove portion to an inner seat portion;
the inner groove portions are cylindrical and positioned to surround respective ones of the outlet passages of the outlet header;
the inner seat portion of the inner groove portions are configured to seat the aft end of the outer ring of the insert; and
the inner groove portions have a depth that is complementary to a length of the outer ring of the insert and have a groove inner diameter that is larger than the diameter of the outer ring of the insert.

10. The heat exchanger of claim 9, further comprising
a condenser element that includes a forward end, an aft end, and a condenser body extending aft from the forward end to the aft end, and
wherein the condenser body defines parallel condenser passages extending from the forward end to the aft end, and each of the condenser passages is aligned to face one of the outlet passages in the outlet header and is configured to receive the forward segment of the insert.

11. The heat exchanger of claim 10, wherein
the outer groove portion of the header groove is sized to receive and surround the aft end of the condenser body.

12. The heat exchanger of claim 11, wherein:
the condenser passages each include a sidewall that defines condenser passage grooves;
each of the condenser passage grooves defines a base end, an apex end, and sidewall portions of the sidewall extending from the base end to the apex end, to define an inner diameter at the base end and a nominal diameter at the apex end.

13. The heat exchanger of claim 12, wherein:
the body exterior surface of the insert engages the inner diameter of one of the condenser passages; and
the inner diameter of the outer ring of the insert is larger than the nominal diameter of the one of the condenser passages, so that the forward end of the outer ring of the insert is disposed against the aft end of the condenser body.

14. The heat exchanger of claim 13, further comprising
an inlet header defining an inlet channel and plurality of inlet header passages that are fluidly coupled to both the inlet channel and the condenser passages.

15. A method of manufacturing a parallel passage condensing heat exchanger, the method including:
forming a grooved parallel passage condenser element to include a forward end, an aft end, and a condenser body extending aft from the forward end to the aft end, wherein the condenser body defines parallel condenser passages extending from the forward end to the aft end;
forming a plurality of porous inserts, wherein each insert of the plurality of inserts is formed to include: a forward end, an aft end, and a body extending aft from the forward end to the aft end, the body defining: a body exterior surface; a forward segment that extends aft from the forward end of the insert to a first axial location between the forward and aft ends of the insert, wherein along the forward segment the body exterior surface is without openings and has a frustoconical shape; a middle segment that extends aft from the first axial location to a second axial location that is forward of the aft end of the insert, wherein along the middle segment the body exterior surface is cylindrical; and an aft segment that extends aft from the second axial location to the aft end of the insert, wherein along the aft segment the body exterior surface of the body is cylindrical and defines axially extending grooves, and wherein the grooves are circumferentially spaced apart from each other and extend forward from the aft end of the insert to the middle segment to define a forward end of the grooves; and positioning the inserts in the condenser element, so that the forward segment of the inserts extend into respective ones of the condenser passages.

16. The method of claim 15, wherein the inserts are formed of a porous material having a 30%-40% porosity.

17. The method of claim 15, wherein the condenser passages are each formed to include a sidewall that defines condenser passage grooves, wherein each of the condenser passage grooves defines a base end, an apex end, and sidewall portions of the sidewall extending from the base end to the apex end, to define an inner diameter at the base end and a nominal diameter at the apex end.

18. The method of claim 17, wherein the insert is formed such when the inserts are positioned in the condenser passages, the body exterior surface of the insert engages the inner diameter of the condenser passages, and the inner diameter of the outer ring of the insert is larger than the nominal diameter of the condenser passages, so that the forward end of the outer ring of the insert is disposed against the aft end of the condenser body.

19. The method of claim 18, further comprising:

forming a grooved outlet header to have a forward end, an aft end, and a header body extending between the forward and aft ends, wherein the outlet header defines: an outlet channel that is configured to direct the flow away from the heat exchanger; and outlet passages that are located to face respective ones of the condenser passages, each the of the outlet passages having a forward end, an aft end that is fluidly coupled to the outlet channel, and a passage wall extending between the forward and aft ends; and connecting the outlet header to the condenser element so that the aft segment of the inserts extend into respective ones of the outlet passages in the outlet header.

20. The method of claim 19, wherein:

the outlet header is formed to define a header groove in the forward end of the outlet header that has an outer groove portion and inner groove portions that are surrounded by the outer groove portion;

the outer groove portion defines an outer wall that extends aft from the forward end of the outlet header to an outer seat portion, wherein the outer groove portion of the header groove is sized to receive and surround the aft end of the condenser body; and each of the inner groove portions:

defines an outer wall that extends aft from the outer seat portion of the outer groove portion to an inner seat portion that is configured to seat the aft end of the outer ring of respective ones of the inserts;

is cylindrical and positioned to surround respective ones of the outlet passages of the outlet header; and has a depth that is complementary to a length of the outer ring of the insert and has a groove inner diameter that is larger than the diameter of the outer ring of the insert.

\* \* \* \* \*